United States Patent
Mudulodu (10) Patent No.: US 9,521,579 B1
(45) Date of Patent: Dec. 13, 2016

(54) METHOD AND APPARATUS FOR RATE ADAPTATION IN A WIRELESS COMMUNICATION SYSTEM

(71) Applicant: Sriram Mudulodu, Sunnyvale, CA (US)

(72) Inventor: Sriram Mudulodu, Sunnyvale, CA (US)

(73) Assignee: Redpine Signals, Inc., San Jose, CA (US)

(*) Notice: Subject to any disclaimer, the term of this patent is extended or adjusted under 35 U.S.C. 154(b) by 428 days.

(21) Appl. No.: 13/783,277

(22) Filed: Mar. 2, 2013

(51) Int. Cl.
  *H04W 28/04* (2009.01)
  *H04W 72/04* (2009.01)
  *H04L 27/00* (2006.01)

(52) U.S. Cl.
  CPC ............ *H04W 28/044* (2013.01); *H04L 27/00* (2013.01); *H04W 72/0446* (2013.01)

(58) Field of Classification Search
  USPC ......... 370/328, 252, 329; 375/295, 296, 260
  See application file for complete search history.

(56) References Cited

U.S. PATENT DOCUMENTS

| | | | | |
|---|---|---|---|---|
| 7,680,218 | B2* | 3/2010 | Wilhelmsson | H04L 25/023 370/338 |
| 2007/0206695 | A1* | 9/2007 | Ye et al. | 375/267 |
| 2008/0086662 | A1* | 4/2008 | Li | H04L 1/0003 714/704 |
| 2009/0116401 | A1* | 5/2009 | Ginzburg et al. | 370/252 |
| 2009/0238095 | A1* | 9/2009 | Blackwell et al. | 370/254 |
| 2011/0150113 | A1* | 6/2011 | Oyman et al. | 375/260 |
| 2011/0195731 | A1* | 8/2011 | Jang et al. | 455/501 |
| 2011/0268069 | A1* | 11/2011 | Song | H04W 72/1231 370/329 |

* cited by examiner

*Primary Examiner* — Kodzovi Acolatse
(74) *Attorney, Agent, or Firm* — File-EE-Patents.com; Jay A. Chesavage (57) ABSTRACT

A method for selection of a particular modulation coding selection (MCS) from a plurality of available MCS selects a particular MCS after obtaining SNR_d, SNR_high, SNR_low, and if SNR_d>SNR_high, selecting the highest available MCS, and if SNR_d<SNR_low, selecting the lowest MCS, and if SNR_high>SNR_d>SNR_low, selecting MCS based on computing the function/table for each MCS according to the formula:

$$f(MCS)=(1-PER(\text{length\_packet},MCS,SNR\_d))/\text{length\_packet}(\text{packet\_size},MCS),$$

and thereafter selecting the MCS that maximizes the f(MCS) function. Further the neighboring MCS values are characterized for throughput in a throughput characterization step, and compared in throughput to the above determined throughput. In an embodiment of the invention, SNR_high, SNR_low are found by finding the SNR that satisfies:

PER(length_packet,MCS_lowest, SNR_low)=PER_thresh

PER(length_packet,MCS_highest, SNR_high)=PER_thresh

Where PER_thresh is a design parameter, and MCS_lowest is the lowest MCS and MCS_highest is the highest available MCS.

18 Claims, 4 Drawing Sheets

*Figure 3*
MCS Selection

*Figure 4*
MCS Selection

METHOD AND APPARATUS FOR RATE ADAPTATION IN A WIRELESS COMMUNICATION SYSTEM

The present patent application claims priority of provisional patent application 61/606,348 filed Mar. 2, 2012.

FIELD OF THE INVENTION

The present invention relates to an apparatus and method for modulation and coding rate selection for payload data in a wireless packet. In particular, the invention relates to rate adaptation for wireless devices operating according to the 802.11 family of wireless local area network (WLAN) standards in environments.

BACKGROUND OF THE INVENTION

Figure 1:
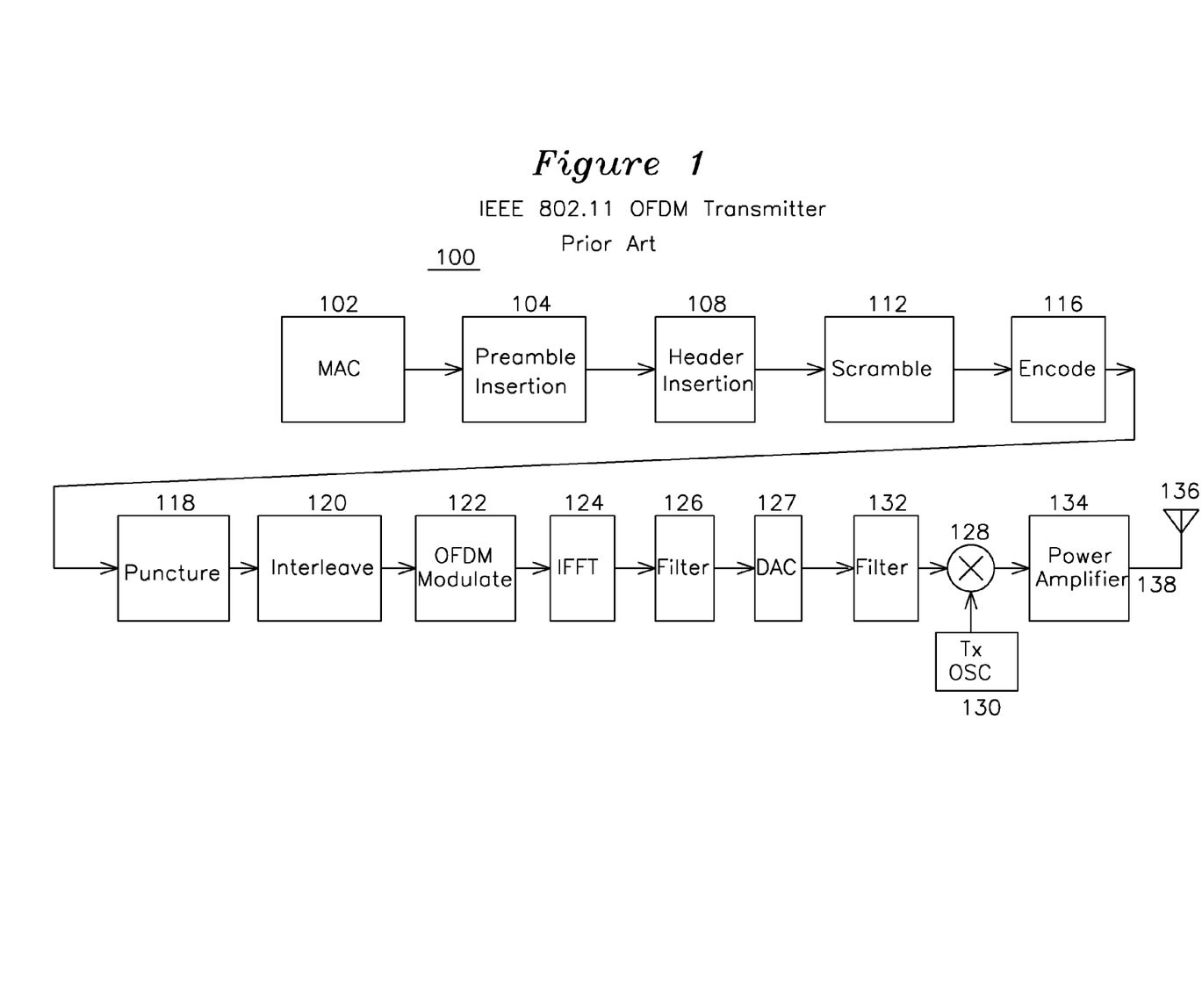
FIG. 1 shows the block diagram for the transmitter of a prior art wireless communications system.

FIG. 1 shows a prior art OFDM transmitter 100. MAC (Medium Access Controller) 102 and associated circuitry, which generate a stream of digital payload data information for forming the payload of a wireless packet. A preamble is pre-pended by function 104 and a packet header including data rate, encoding type, packet length and other information is added by header insertion function 108, and the content is scrambled 112, encoded 116, punctured 118, interleaved 120, and modulated into a plurality of subcarriers 122. An IFFT function 124 converts the complex valued frequency domain modulation information provided by 122 into a complex valued time domain waveform having I and Q components, which is filtered 126, converted to an analog signal 127, and low pass filtered 132 to remove out of band components introduced by the conversion, mixed to a carrier frequency such as 2.4 Ghz by mixer 128 and transmit oscillator 130, and applied to a power amplifier 134, which is coupled to an antenna 136 for transmission through the wireless media.

In wireless systems, such as wireless LANs, there is often interference due to nodes within a network or from other networks. There is also the effect of channel, thermal noise and other RF impairments. In many situations the goal is to maximize the throughput in a link between two nodes. In a WLAN system, for example, it is desirable to maximize the throughput between an AP and a station. In most wireless systems such as WLAN, there is a set of modulation and code rates that the transmitter can select to use in transmitting data to the intended receiver, which are performed by the modulator 122 of FIG. 1 with the associated modulation index provided to header insert function 108. Modulation and coding selection (MCS) is the term used to describe the process of evaluating possible modulations and code rates for use in a particular communications link, and the currently available modulation and code rates for IEEE 802.11n (1 to 4 spatial streams) are shown below for reference:

TABLE 1

| | | | | Data rate (Mbit/s) | | | |
| | | | | 20 MHz channel | | 40 MHz channel | |
| MCS index | Spatial streams | Modulation type | Code rate | 800 ns GI | 400 ns GI | 800 ns GI | 400 ns GI |
| --- | --- | --- | --- | --- | --- | --- | --- |
| 0 | 1 | BPSK | ½ | 6.5 | 7.2 | 13.5 | 15 |
| 1 | 1 | QPSK | ½ | 13 | 14.4 | 27 | 30 |
| 2 | 1 | QPSK | ¾ | 19.5 | 21.7 | 40.5 | 45 |
| 3 | 1 | 16-QAM | ½ | 26 | 28.9 | 54 | 60 |
| 4 | 1 | 16-QAM | ¾ | 39 | 43.3 | 81 | 90 |
| 5 | 1 | 64-QAM | ⅔ | 52 | 57.8 | 108 | 120 |
| 6 | 1 | 64-QAM | ¾ | 58.5 | 65 | 121.5 | 135 |
| 7 | 1 | 64-QAM | ⅚ | 65 | 72.2 | 135 | 150 |
| 8 | 2 | BPSK | ½ | 13 | 14.4 | 27 | 30 |
| 9 | 2 | QPSK | ½ | 26 | 28.9 | 54 | 60 |
| 10 | 2 | QPSK | ¾ | 39 | 43.3 | 81 | 90 |
| 11 | 2 | 16-QAM | ½ | 52 | 57.8 | 108 | 120 |
| 12 | 2 | 16-QAM | ¾ | 78 | 86.7 | 162 | 180 |
| 13 | 2 | 64-QAM | ⅔ | 104 | 115.6 | 216 | 240 |
| 14 | 2 | 64-QAM | ¾ | 117 | 130 | 243 | 270 |
| 15 | 2 | 64-QAM | ⅚ | 130 | 144.4 | 270 | 300 |
| 16 | 3 | BPSK | ½ | 19.5 | 21.7 | 40.5 | 45 |
| 17 | 3 | QPSK | ½ | 39 | 43.3 | 81 | 90 |
| 18 | 3 | QPSK | ¾ | 58.5 | 65 | 121.5 | 135 |
| 19 | 3 | 16-QAM | ½ | 78 | 86.7 | 162 | 180 |
| 20 | 3 | 16-QAM | ¾ | 117 | 130.7 | 243 | 270 |
| 21 | 3 | 64-QAM | ⅔ | 156 | 173.3 | 324 | 360 |
| 22 | 3 | 64-QAM | ¾ | 175.5 | 195 | 364.5 | 405 |
| 23 | 3 | 64-QAM | ⅚ | 195 | 216.7 | 405 | 450 |
| 24 | 4 | BPSK | ½ | 26 | 28.8 | 54 | 60 |
| 25 | 4 | QPSK | ½ | 52 | 57.6 | 108 | 120 |
| 26 | 4 | QPSK | ¾ | 78 | 86.8 | 162 | 180 |
| 27 | 4 | 16-QAM | ½ | 104 | 115.6 | 216 | 240 |
| 28 | 4 | 16-QAM | ¾ | 156 | 173.2 | 324 | 360 |
| 29 | 4 | 64-QAM | ⅔ | 208 | 231.2 | 432 | 480 |
| 30 | 4 | 64-QAM | ¾ | 234 | 260 | 486 | 540 |
| 31 | 4 | 64-QAM | ⅚ | 260 | 288.8 | 540 | 600 |

In the prior art, Modulation and Coding Selection (MCS) typically follows a heuristic model, where the repetitive failure of a particular MCS results in the selection of modulation and coding associated with a successively slower data rate until the channel communication is functioning with satisfactory throughput. Satisfactory throughput performance of prior art wireless systems is determined by the receipt of acknowledgement packets for each previously transmitted packet, indicating the channel is not losing packets. Packets which are corrupted during the receive process, such as by multi-path reflection or from an interferer on an adjacent channel or the same channel, or from a device such as a microwave oven operative on the ISM (industrial, scientific, medical) frequency band shared with WLAN networks, may require different treatment depending on the underlying cause for the packet being lost or not being decoded by the recipient.

There are many different causes for loss of throughput when using an MCS which was previously satisfactory. One cause for reduced throughput leading to reduced rate MCS is greater separation or a change in orientation between transmitter and receiver, thereby causing a change in the wireless channel, or interference on the WLAN. Another cause for reduced channel throughput is high channel utilization resulting in increased collisions between the various transmitters sharing the highly utilized channel. Each of these issues requires a different solution. For example, if the underlying cause of loss of throughput is collision or interference from other packets, then a reduction in data rate such as by a new MCS selection will result in increased packet duration and associated consumption of time intervals on the channel. This increased consumption of time by packets on the highly utilized channel results in greater chance of collision and also consumes valuable available time for transmission by other devices, reducing throughput for the other devices on the network.

One prior art MCS selection algorithm is known as the minstrel algorithm and has been used widely. In this heuristic algorithm, the throughput across all the possible MCS in a particular wireless link are obtained by actual throughput measurement for each modulation type and data rate, and saved into a throughput table of entries showing throughput for each data rate, which is updated over time. Additionally, the selection of modulation type and rate may also be modified by a weighting function which gives more weight to newer results than older results. The optimal MCS is then chosen based on examination of the table of MCS vs throughput table. The minstrel algorithm assumes the throughput vs. MCS behavior is unknown and aims to obtain it by actual measurements.

It is desired to provide a method and apparatus for achieving a maximum utilization of the wireless network in the presence of interference sources.

OBJECTS OF THE INVENTION

A first object of the invention is a rate adaptation algorithm which selects an optimal MCS selection for a given network condition.

A second object of the invention is a rate adaptation algorithm which selects a higher rate MCS selection when packets are lost from an interferer or from network collisions than the MCS selection made when packets are lost due to causes other than collisions or interference, such as errors due the wireless channel and thermal noise.

A third object of the invention is a process for selection of a modulation and coding type for transmission over a wireless channel, the process including:
  a channel characterization step;
  a collision characterization step;
  a modulation coding selection step which selects a higher MCS selection when packets are lost from an interferer or from network collisions than when packets are lost from multi-path interference or channel fading.

SUMMARY OF THE INVENTION

In one embodiment of the invention, a modulation coding selection (MCS) process and apparatus uses performance measurements for a variety of MCS to determine the highest throughput MCS for a particular transmitter based on packet throughput measurements.

In another embodiment of the invention based on an actual or derived signal to noise ratio (SNR) (derived from the channel matrix H) using EESM (Effective Exponential SNR Mapping), a modulation coding selection (MCS) process and apparatus uses the SNR estimate (SNR_d) to select an MCS for use, using a highest available MCS when the derived SNR is above a first threshold, using a lowest available MCS when the derived SNR is below a second threshold, and throughput metrics computed from packet error rate (PER) for known packet length, and MCS, when the SNR is below the first threshold and above the second threshold. The MCS selection may optionally be modified by combining the initial MCS selection result with actual channel performance measurements.

DETAILED DESCRIPTION OF THE INVENTION

The present MCS algorithm of the present invention selects a modulation type and rate based on a characterization of the underlying causes of loss of packets or packet errors and the associated impact on throughput.

The present methods reduce the effects of two classes of degradation which cause reduction in throughput for a given modulation type. The first class of degradation in throughput reduction is caused by interference and collisions, and the second class of degradation is due to the effect of thermal noise for the given wireless channel and RF transceiver impairments. To minimize the effect of outside interference on the current transmission and to reduce the probability of collision with another transmitter, it is always best to transmit using the highest MCS. However, for the particular conditions of a given channel, the highest MCS may not be optimal.

Figure 2:
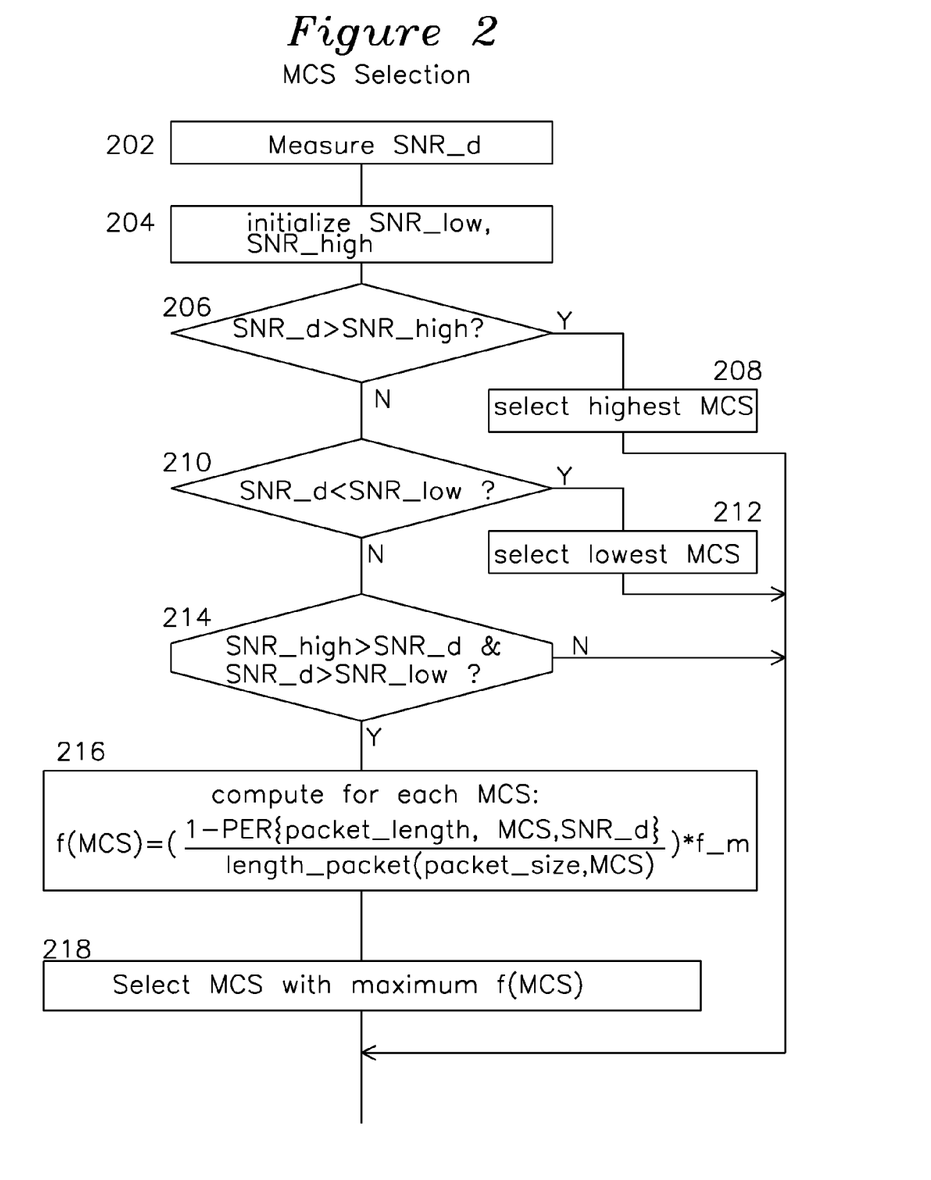
FIGS. 2, 3, and 4 show the flowchart for an MCS selection method.

The steps of the algorithm are shown in FIG. 2 and include the steps of:

1. Obtain SNR_d 202 and establish values for SNR_high, SNR_low in step 204. SNR_d is a derived SNR that may be a function of H_hat which represents an estimate of the channel matrix H and the thermal noise power. SNR_high and SNR_low are used as threshold levels, and are design parameters which can be selected according to a desired threshold of packet error rate (PER), as will be described.

2. From among the available MCS (such as those listed in table 1), and where the "highest MCS" is the one associated with the highest data rate, and the "lowest MCS" is the one associated with the lowest data rate, select the highest MCS if SNR_d>SNR_high (as shown in step 206), or select the lowest MCS if SNR_d<SNR_low (as shown in step 210). In alternative embodiments of the invention, the receive signal strength indication (RSSI) may be used in place of SNR_d.

3. If SNR_high>SNR_d>SNR_low (as shown in step 214), select the MCS based on the following method:

3a. As shown in step 216, obtain the a table of f(MCS) for each MCS using the following function:

$f(MCS) = f\_m * (1 - PER(length\_packet, MCS, SNR\_d)) / length\_packet(packet\_size, MCS)$ where:
   f_m is a correction factor (described later) with a default value of 1;
   f(MCS) is the estimated throughput (bits/second) in the absence of collisions or interference for a particular MCS;
   length_packet is the length of the packet in units of time, and is a function of the packet size and the MCS. The value length_packet also depends on the packet format, whereas packet_size is simply the number of bytes of data in the packet.

3b. Select the MCS that maximizes the above function f(MCS), as shown in step 218, which value will be referred to as MCS_max_f.

The packet size and packet format are generally fixed a priori and not selected by the algorithm, although it is possible in some embodiments for packet size and format to be selected for optimization by the MCS algorithm.

In one embodiment of the invention, the process is completed when MCS_max_f is identified as described above and selected for transmission. In another embodiment of the invention, MCS_max_f and the next higher MCS (an adjacent and available MCS with the next higher data rate such as from table 1) are characterized for throughput on the channel during a throughput characterization step for these two rate candidates, and the MCS with the higher throughput is selected. In various embodiments of the invention, the throughput characterization step may be performed by a transmitting station using packets which are not part of a data transmission from a request, or data throughput f(MCS) statistics may be collected from data re-transmission requests in combination with received collision or interference statistics to estimate a channel throughput for a particular MCS using packets which are being transmitted over a wireless channel.

In one embodiment of the invention, f(MCS) is an estimate of the non-collision, non-interference throughput for a particular packet size and MCS (the estimated throughput for a particular MCS and packet size in a collision-free, interference free channel), and f_m (shown in step 216 of FIGS. 2, 3, and 4) is a correction factor such that f(MCS) *f_m is the estimated throughput in the presence of collisions and interference on the channel.

In another embodiment of the invention, MCS_max_f as well as the next lower MCS from MCS_max_f and next higher MCS above MCS_max_f are each characterized for throughput on the channel during a throughput characterization step for these three candidates, and the MCS with the highest throughput is selected.

In another embodiment of the invention, once MCS_max_f is identified, the throughput of the next higher MCS candidate is obtained through a throughput characterization step which measures throughput (that excludes the effects of collisions and interference) for this particular MCS. If the throughput of this MCS candidate is higher than MCS_max_f, then the observed (collision and interference-free) throughput for the yet next higher MCS is also obtained (through the throughput characterization step). If the new candidate has a higher estimated throughput than the observed throughput of the preceding candidate, the step is repeated until a local peak is found or the highest MCS in the list of available MCS is reached and the search stops. If the next higher MCS from MCS_max_f has a lower throughput than the current MCS_max_f, then the next lower MCS from MCS_max_f is characterized for throughput (in the absence of collisions and interference, as before). If this candidate is higher than MCS_max_f, then a further lower MCS is characterized for throughput. This is repeated until a local peak is found in the throughput or the lowest MCS is reached. If both the next higher and the next lower MCS from the MCS_max_f have lower throughput than MCS_max_f, them MCS_max_f is chosen and the search stops. As described earlier, for each estimated throughput characterization step, an estimate of throughput is made which removes the effect of collisions and interference.

In an embodiment of the invention, SNR_d is obtained in the following manner: first the estimate H_hat of the channel matrix H is used to compute an EESM (Exponential Effective Signal to noise ratio Mapping) SNR using the nominal value of the thermal noise power at room temperature using the Nyquist thermal noise formula $e_n(rms)=\sqrt{4kTB}$ (with units volts per square root Hertz), such that for a 50Ω system at room temperature, $e_n$=0.9 nv/√hz. In some embodiments, the temperature may be read from a temperature sensor and the thermal noise power is calculated based on the known bandwidth, as is known to one skilled in the art of noise bandwidth and noise power. In one embodiment of the invention, the EESM is computed as:

$$SNR\_d = -\beta \ln\left(\frac{1}{N}\sum_{i=1}^{N} e^{-\frac{SNR_i}{\beta}}\right)$$

where:

$SNR_i$ is the per-subcarrier ratio of the channel power of the i-th subcarrier to the noise power of the i-th subcarrier, and the summation is done over all the data subcarriers which are N in number. Typically the total noise power is estimated using the Nyquist formula as shown above. The channel power on the i-th subcarrier is obtained based on the channel estimate, and SNR is then obtained as the ratio of this channel power multiplied by the total number of subcarriers (includes data, pilot and guard or null subcarriers) in the OFDM system, to the total noise power.

β is a tuning parameter which may vary in value.

Figure 3:
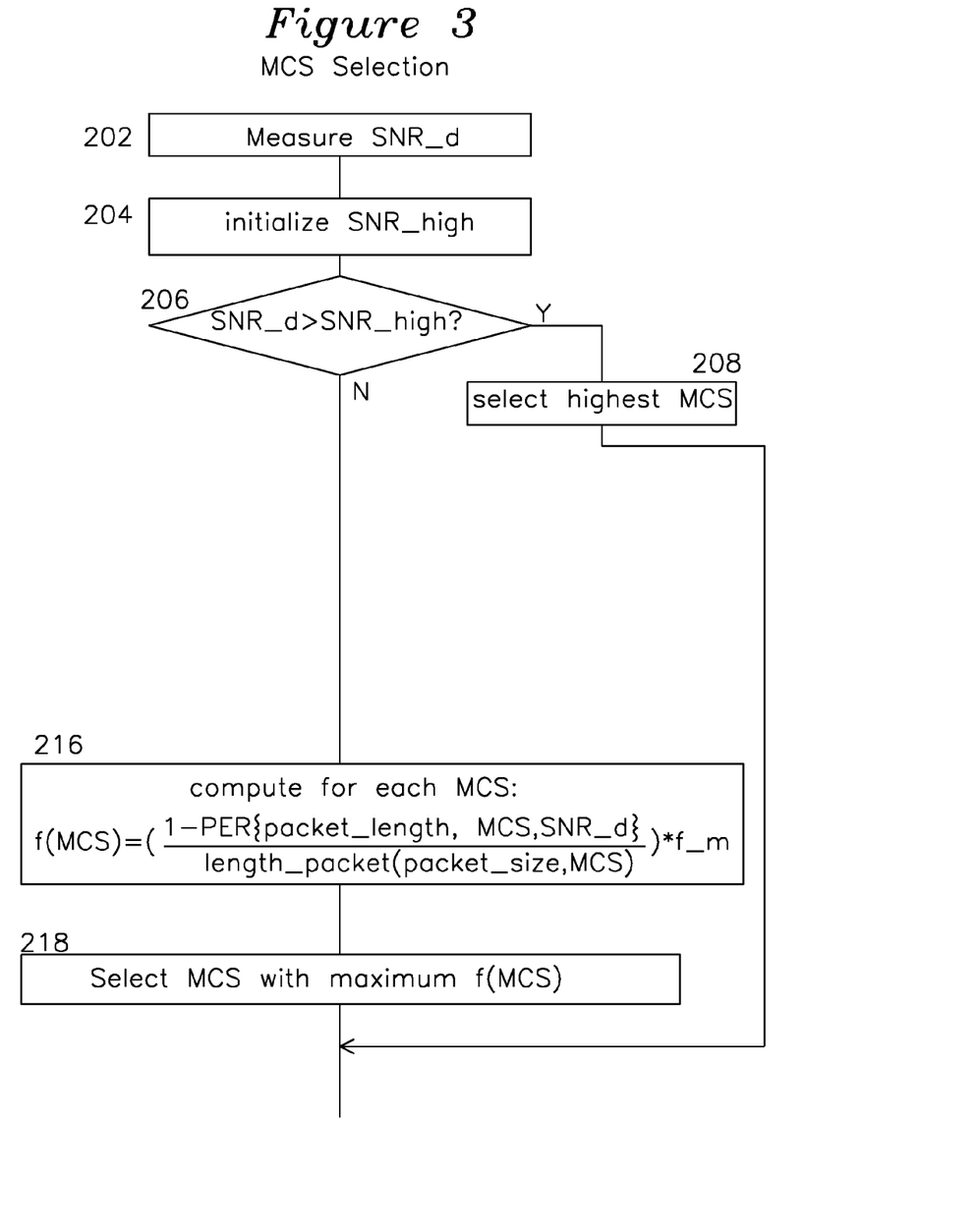
Figure 4:
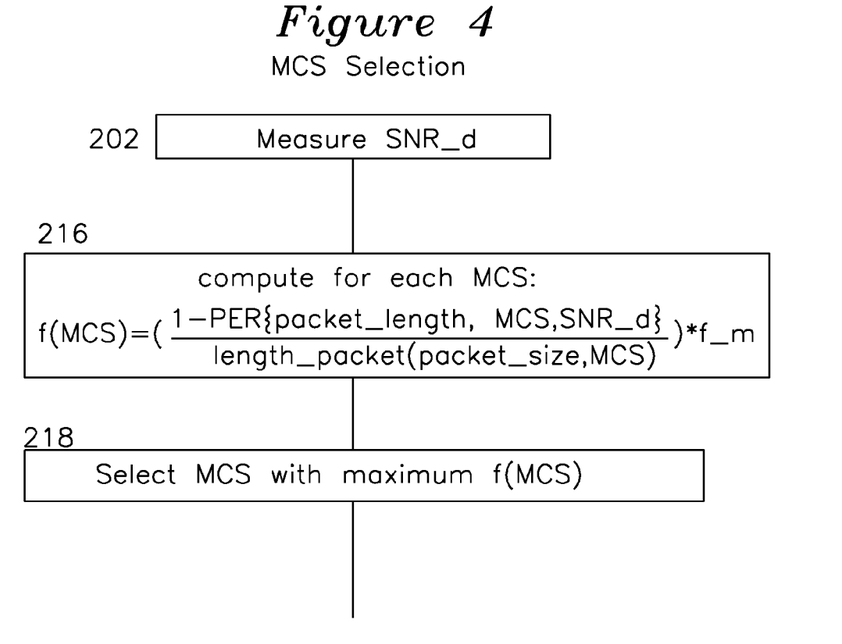

In an embodiment of the invention, the SNR_low comparison step is skipped, as is shown in FIG. 4 with reference to the corresponding steps of FIG. 2. In other embodiments both SNR_low and SNR_high comparison steps are skipped, as shown in FIG. 3 with reference to the corresponding steps of FIG. 2. This is especially useful when doing analytical computation rather than measurements, since there is no time lost in obtaining f(MCS) by computation (as opposed to doing measurements) for a variety of candidate MCS.

In another embodiment of the invention, SNR_high, SNR_low (as shown in FIG. 2 for SNR_low and SNR_high; and FIG. 3 for SNR_high) are found by finding the SNR that satisfies:

PER(length_packet,MCS_lowest,
   SNR_low)=PER_thresh

And

PER(length_packet,MCS_highest,
   SNR_high)=PER_thresh;

Where PER_thresh is a design parameter, and MCS_lowest is the lowest MCS (MCS with the lowest data rate) and MCS_highest is the highest MCS (MCS with the highest data rate) from the range of available MCS. In one embodiment, PER_thresh is chosen as 0.01 (or 1%). In other embodiments, PER_thresh is chosen as a function of the measured collision rate. In one embodiment, PER_thresh=alpha* ratio of number of collisions to total number of packets. Alpha is yet another design parameter. In one embodiment, alpha has a value which is in the range from 0 to 0.25.

In one embodiment, PER(length_packet, MCS, SNR_d) is obtained by using the pre-measured AWGN performance for the packet length and using SNR_d for the SNR. A table of packet error rate (PER) versus SNR can then be formed for specific packet lengths. In various embodiments, the performance is measured only for those specific packet lengths and interpolated for other packet lengths. For example, during transmission of data in normal operation, the packet length could be varied along with MCS, the PER corrected to exclude the effect of collisions and interference, and the results of these measurements maintained in a table and refreshed with new results from time to time. In this manner, no time would be lost or spent sending packets which do not transfer data but only provide throughput information. Typically the packet length has only a few discrete values and the PER versus SNR table can be obtained for all these values of packet lengths. Once this table is available, the SNR_d is used to lookup the PER for use in the f(MCS) calculation. In another embodiment of the invention, SNR_d is used to calculate the BER for a given MCS and then multiplied with the packet_size to obtain the PER. The BER for a given MCS can be obtained using the standard formula for M-ary QAM constellations and adjusting the SNR_d by the coding gain of the code used. Each coding type has an associated coding gain, such that the coding gain can be measured or determined from tables associating coding gain vs MCS as is known in the art of coding.

Packet_length (packet_size,MCS) can be computed based on the number of data bits per constellation symbol for a given MCS. For example in the 802.11n standard, assuming 20 MHz bandwidth, the number of data bits per OFDM symbol is given by N_DBPS in table 20-29 of the standard. This was simply obtained by multiplying N_SD which is the number of data sub-carriers per OFDM symbol with the number of data bits per constellation symbol. For MCS 0, the number of data bits per OFDM symbol is ½. So N_DBPS=52*½=26. For a packet size of 1500 bytes, the number of OFDM symbols required is ceil(1500* 8/26)=462. The size of an OFDM symbol excluding the GI for 20 MHz bandwidth in 802.11n is 3.2 us. For GI of ¼ the OFDM symbol size, the length of the packet contributed by the data bits alone is therefore 462* 3.2*(1+¼)=1848 us. Based on the packet format, the overhead due to the preambles, signal fields etc. is further added to this length. In this manner, the packet length can be computed from packet_size, GI size, and packet format (e.g. mixed mode, green field, VHT mixed mode). Additionally, the effect of inter packet gap can also be added to the packet_length. In addition the size of the ACK packet and the associated inter packet gap may also be added to obtain the packet_length parameter.

In other embodiments of the invention, f(MCS) is obtained from the non-collision packet error rate (PER_nc), where the range of PER_nc is from 0 for an error-free channel to 1 for 100% errors in the channel, counting only errors not due to collisions, referred to as non-collision errors, in contrast to collision errors from short term effects such as collisions and interference. In this embodiment, f(MCS) is obtained as (1-PER_nc), where the PER_nc is obtained by measurements of the number of transmitted packets that did not get acknowledged, the cause not being due to channel collisions. Stated differently, only the packets lost or decoded incorrectly due to thermal noise are counted as non-collision errors. In order to know the cause, the receiver estimates or determines if the packet was lost or decoded with an error due to a collision or due to noise. In one embodiment where the wireless network is a WLAN system, the receiver attributes a successfully detected packet (using the short and long preambles) with an associated unsuccessfully decoded SIGNAL field (in the case of wireless LAN packets), to collision error. In another embodiment it also measures the SNR and attributes an error to a collision error only if the SIGNAL field is in error AND the measured SNR is higher than a threshold level SNR_SIG_FLD, which is a design parameter that essentially captures the lowest SNR at which the SIGNAL field can be decoded with PER_nc greater than a threshold value PER_SIG_FLD. In this embodiment, PER_SIG_FLD has a fixed value which is equal to or less than 0.05 (or 5%), and is preferably set to 0.01 (1%). The receiver may also attribute an error in the packet to collision and count that packet as a collision error if the error vector magnitude (EVM) computed during the beginning of the packet changes by more than a threshold value EVM_thresh during the course of the packet. The EVM can be computed by averaging across subcarriers, the error between the received symbols after channel equalization and the actual transmitted symbols. Since the actual transmitted symbols are not known for data subcarriers, the re-encoded symbols after decoding can be used as reference. The averaging across the subcarriers can be done in the linear domain first and then converted to log or dB domain. In another embodiment, the averaging across the subcarriers is done after converting to the log domain. In one embodiment, EVM_thresh=3 dB. In various embodiments, the EVM threshold method is not used when the SNR is less than a threshold SNR_c_thresh2. In various embodiments SNR_c_thresh2 is obtained as PER(length_packet,MCS,
SNR_c_thresh2)=PER_c_thresh2.

In an embodiment, PER_c_thresh2 is 0.25 (or 25%)
In various embodiments, the receiver attributes an error in the packet to collision if the SNR_d>SNR_c_thresh, where SNR_c_thresh is determined by the following relation:

PER(length_packet,MCS,
SNR_c_thresh)=PER_c_thresh

In an embodiment, the parameter PER_c_thresh=0.05 (or 5%).

In various embodiments of the invention, the function f(MCS) is modified by multiplying the above f(MCS) by f_m(packet_length), as described below.

In one embodiment of the invention f_m(packet_length)=1−PCR(packet_length) where PCR is the packet collision rate which is obtained as the ratio of the number of packets lost due to collision to the total number of packets. In another embodiment of the invention, PCR(packet_length) is obtained as PCR(packet_length)=I_0* packet_length, where I_0 is obtained as the average of the ratios of number of packets lost due to collisions to the product of the total number of packets and the length of the packet. In this embodiment, when there are multiple packet_lengths, the ratio of packets lost due to collisions to the total number of packets is calculated separately for each packet_length encountered and then averaged.

In another embodiment of the invention, the number of packets lost or not decoded due to collision from a station is fed back to the transmitter as an informational packet from the station, and the transmitter then computes f_m(MCS) above. In another embodiment, the f_m(MCS) value at the station is fed back to the transmitter. In other embodiments of the invention, f_m(MCS) is obtained by using transmitter obtained measurements without any feedback from the receiver. In an embodiment of the invention, the transmitter obtains the packets lost or not decoded by the receiver due to collisions, by taking the difference of the number of packets transmitted for which no acknowledgement was received and the expected number of packet errors calculated based on the wireless channel and expected thermal noise, in the manner described above for obtaining PER. This is possible in a TDD system, since the wireless propagation channel is reciprocal. The transmitter then computes PCR as the ratio of the number of packets lost or not decoded by the receiver due to collisions to the total number of packets transmitted. In one embodiment, the PCR which was computed for each particular length of packet is used when transmitting this particular length. In another embodiment, the method ignores the length and obtains the ratio based on the total numbers of packets. In various embodiments, the history over which these statistics are measured is maintained over a moving window of time. In another example embodiment, past measurements are ignored. In another embodiment, a weighting function is used such that past ratios are given lower weight than future ones. In another embodiment, the weighting is done on the number of packets (instead of ratios) such that in any measurement interval the exact same weight is used for both the numerator and denominator.

In various embodiments the above operations of determining the best MCS is repeated periodically with a fixed period. In an embodiment this fixed period is 5 seconds. In various embodiments, the second step (and then further the 3rd step) is repeated if there is change in SNR_d by more than a threshold value delta_SNR_d. In an embodiment delta_SNR_d=2 dB. In various embodiments, step 3b is repeated if the PCR changes by more than 10%.

I claim:

1. A method for the selection of a particular Modulation and Coding Selection (MCS) from a plurality of available MCS in a wireless communications system, the method having the steps:
    obtaining a derived signal to noise ratio (SNR_d);
    establishing threshold values SNR_high, SNR_low;
    if SNR_d>SNR_high, selecting the highest MCS;
    if SNR_d<SNR_low, selecting the lowest MCS;
    if SNR_high>SNR_d>SNR_low, selecting MCS based on:
    obtaining a table of the product of f(MCS) and f_m corresponding to each MCS, where f(MCS) is an estimate of throughput in the absence of collisions or interference, and f_m is a correction factor for the effects of collisions or interference;
    selecting the MCS that maximizes said product of f(MCS) and f_m;
    said plurality of MCS including at least a modulation type and a coding rate;
    and where said method steps are repeated when a change in SNR_d of more than 2 dB since a previous transmission occurs.

2. The method of claim 1 where $$f(MCS) = \frac{1 - PER(\text{length\_packet}, MCS, \text{H\_hat}, \text{noise\_power})}{\text{length\_packet}(\text{packet\_size}, MCS)};$$

where f(MCS) is an estimated throughput for a particular MCS in the absence of collisions or interference where:
PER is a packet error rate;
length_packet is the length of the packet;
MCS is a particular Modulation and Coding Selection;
H_hat is an estimate of the channel matrix H;
noise_power is an estimated noise level in the absence of collisions or interference.

3. The method of claim 1 where SNR_d, SNR_high, SNR_low are derived from receive signal strength indication (RSSI).

4. The method of claim 3 where SNR_high is selected such that PER(length_packet, MCS_highest, SNR_high)=PER_thresh, where:
    PER is the packet error rate of the communications channel and excludes the effect of collisions, and said PER is a function of said length_packet which is the time duration of a packet, said MCS_highest is an MCS corresponding to the highest data rate, and said PER_thresh is less than or equal to 1%.

5. The method of claim 3 where SNR_low is selected such that PER(length_packet, MCS_lowest, SNR_low)=PER_thresh, where:
    PER is the packet error rate of the communications channel, and said PER is a function of said length_packet which is the time duration of a packet, said MCS_lowest is an MCS corresponding to the lowest data rate, and said PER_thresh has a value which is equal to or less than 1%.

6. The method of claim 1 where SNR_d is derived from a channel characterization matrix, and SNR_high and SNR_low are derived from a packet error rate.

7. The method of claim 6 or claim 5 where a packet error rate threshold (PER_thresh)=alpha* the ratio of collisions on a channel to total packets on a channel, and where alpha is less than or equal to 0.25.

8. The method of claim 1 where said length_packet is computed from said MCS, a guard interval, a payload length, and a preamble length.

9. The method of claim 1 where said length_packet is computed from said MCS, a guard interval, a payload length, a preamble length, and an inter-packet gap.

10. The method of claim 1 where said f(MCS) is derived from measurement of the number of transmitted packets that did not get acknowledged but were not the result of collisions.

11. The method of claim 1 where said f(MCS) is derived from measurement of packets in a communications channel which were not acknowledged and lost or not decoded due to thermal noise of said packet.

12. The method of claim 1 where said SNR_d is derived from an unsuccessfully decoded SIGNAL field of a packet header and successfully decoded SIGNAL field of other packet headers.

13. The method of claim 1 where said f(MCS) is multiplied by a f_m(MCS) factor derived from a peak information rate and packet length.

14. The method of claim 1 where said f(MCS) associated with a particular remote station is computed from information which includes retransmission requests from said particular remote station.

15. A method for selection of a Modulation and Coding Selection (MCS) from a plurality of available MCS in a wireless communications system, the method having the steps:
    obtaining a derived signal to noise ratio (SNR_d);
    establishing threshold values SNR_high, SNR_low;
    if SNR_d>SNR_high, selecting the highest MCS;
    if SNR_d<SNR_low, selecting the lowest MCS;
    if SNR_high>SNR_d>SNR_low, selecting MCS based on:
    obtaining a table of the product of f(MCS) and f_m corresponding to each MCS, where f(MCS) is an estimate of throughput in the absence of collisions or interference, and f_m is a correction factor for the effects of collisions or interference;
    selecting the MCS that maximizes said product of f(MCS) and f_m;
    and where said method of selection repeats when a change in SNR_d is detected.

16. A method for the selection of a particular Modulation and Coding Selection (MCS) from a plurality of available MCS in a wireless communications system, the method having the steps:
    obtaining a derived signal to noise ratio (SNR_d);
    establishing threshold values SNR_high, SNR_low;
    if SNR_d>SNR_high, selecting the highest MCS;

if SNR_d<SNR_low, selecting the lowest MCS;
if SNR_high>SNR_d>SNR_low, selecting MCS based on:
obtaining a table of the product of f(MCS) and f_m corresponding to each MCS, where f(MCS) is an estimate of throughput in the absence of collisions or interference, and f_m is a correction factor for the effects of collisions or interference;
selecting the MCS that maximizes said product of f(MCS) and f_m;
said plurality of MCS including at least a modulation type and a coding rate where $$f(MCS) = \frac{1 - PER(\text{length}_{packet}, MCS, H_{hat}, \text{nosie}_{power})}{\text{length\_packet}(packet_{size}, MCS)}$$

where f(MCS) is an estimated throughput for a particular MCS in the absence of collisions or interference and where:
PER is a packet error rate;
length_packet is the length of the packet;
MCS is a particular Modulation and Coding Selection;
H_hat is an estimate of channel matrix H;
Noise power is an estimated noise level in the absence of collisions or interference.

17. A method for the selection of a particular Modulation and Coding Selection (MCS) from a plurality of available MCS in a wireless communications system, the method having the steps:
obtaining a derived signal to noise ratio (SNR_d);
establishing threshold values SNR_high, SNR_low;
if SNR_d>SNR_high, selecting the highest MCS;
if SNR_d<SNR_low, selecting the lowest MCS;
if SNR_high>SNR_d>SNR_low, selecting MCS based on:
obtaining a table of the product of f(MCS) and f_m corresponding to each MCS, where f(MCS) is an estimate of throughput in the absence of collisions or interference, and f_m is a correction factor for the effects of collisions or interference;
selecting the MCS that maximizes said product of f(MCS) and f_m;
said plurality of MCS including at least a modulation type and a coding rate;
where SNR_d, SNR_high, SNR_low are derived from receive signal strength indication (RSSI)
where SNR_high is selected such that
PER(length_packet, MCS_highest, SNR_high)= PER_thresh, where:
PER is the packet error rate of the communications channel and excludes the effect of collisions, and said PER is a function of said length_packet which is the time duration of a packet, said MCS_highest is an MCS corresponding to the highest data rate, and said PER_thresh is less than or equal to 1%.

18. A method for the selection of a particular Modulation and Coding Selection (MCS) from a plurality of available MCS in a wireless communications system, the method having the steps:
obtaining a derived signal to noise ratio (SNR_d);
establishing threshold values SNR_high, SNR_low;
if SNR_d>SNR_high, selecting the highest MCS;
if SNR_d<SNR_low, selecting the lowest MCS;
if SNR_high>SNR_d>SNR_low, selecting MCS based on:
obtaining a table of the product of f(MCS) and f_m corresponding to each MCS, where f(MCS) is an estimate of throughput in the absence of collisions or interference, and f_m is a correction factor for the effects of collisions or interference;
selecting the MCS that maximizes said product of f(MCS) and f_m;
said plurality of MCS including at least a modulation type and a coding rate;
where SNR_d, SNR_high, SNR_low are derived from receive signal strength indication (RSSI)
where SNR_low is selected such that
PER(length_packet, MCS_lowest, SNR_low)= PER_thresh, where:
PER is the packet error rate of the communications channel and excludes the effect of collisions, and said PER is a function of said length_packet which is the time duration of a packet, said MCS_lowest is an MCS corresponding to the lowest data rate, and said PER_thresh is less than or equal to 1%.

* * * * *